(12) United States Patent
Stockmeier et al.

(10) Patent No.: US 9,327,678 B1
(45) Date of Patent: May 3, 2016

(54) METHODS AND APPARATUS FOR RESTRAINING VEHICULAR PASSENGERS WITH ASSEMBLY INCLUDING FEEDBACK SENSOR

(71) Applicant: Honda Motor Co., Ltd., Tokyo (JP)

(72) Inventors: Kevin Stockmeier, Marysville, OH (US); Michael Griffin, Marysville, OH (US); Noriyuki Muto, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/662,087

(22) Filed: Mar. 18, 2015

(51) Int. Cl.
| | |
|---|---|
| *B60R 22/02* | (2006.01) |
| *B60R 22/28* | (2006.01) |
| *B60R 22/34* | (2006.01) |
| *B60R 22/48* | (2006.01) |

(52) U.S. Cl.
CPC .............. *B60R 22/023* (2013.01); *B60R 22/28* (2013.01); *B60R 22/34* (2013.01); *B60R 22/48* (2013.01); *B60R 2022/4816* (2013.01)

(58) Field of Classification Search
CPC ........................................................ B60R 22/48
See application file for complete search history.

(56) References Cited

U.S. PATENT DOCUMENTS

| | | | | |
|---|---|---|---|---|
| 3,822,915 | A * | 7/1974 | Colucci | B60R 22/26 280/806 |
| 4,163,128 | A | 7/1979 | Miskowicz | |
| 4,919,488 | A * | 4/1990 | Deegener | B60R 22/26 297/468 |
| 5,203,829 | A | 4/1993 | Fisk et al. | |
| 5,735,041 | A * | 4/1998 | Zaguskin | B60R 16/0207 29/857 |
| 6,076,894 | A | 6/2000 | Busch | |
| 6,139,111 | A | 10/2000 | Pywell et al. | |
| 6,340,173 | B1 * | 1/2002 | Specht | B60R 21/18 280/733 |
| 6,405,685 | B1 * | 6/2002 | Cox | A62B 35/0031 119/857 |
| 6,705,641 | B2 * | 3/2004 | Schneider | B60R 21/18 280/733 |
| 6,773,075 | B2 | 8/2004 | Rouhana et al. | |
| 6,817,629 | B2 * | 11/2004 | Herberg | B60R 22/02 280/801.1 |
| 7,163,081 | B2 * | 1/2007 | Muhich | A62B 35/04 119/857 |
| 7,209,033 | B2 * | 4/2007 | Hofbeck | B60N 2/002 180/287 |

(Continued)

FOREIGN PATENT DOCUMENTS

| | | | |
|---|---|---|---|
| EP | 1942036 B1 | 7/2008 | |
| GB | 2481586 A * | 1/2012 | B60R 22/48 |

(Continued)

*Primary Examiner* — Nicole Verley
(74) *Attorney, Agent, or Firm* — Kenealy Vaidya LLP

(57) ABSTRACT

A vehicular seat belt assembly includes a pair of lateral webbing strips that extend laterally across the passenger's lap, proximal ends being manually connectable and dis-connectable from each other. A vertically extending webbing strip includes a pair of upper body strips that are configured to contact opposite sides of a front of the passenger's upper body. A sensor is configured to provide data indicative of whether the proximal ends of the pair of lateral webbing strips are connected together. A harness assembly includes a harness webbing that is attached to one of the pair of lateral webbing strips, and a wire harness that is connectable to the sensor, the wire harness extending along the harness webbing.

20 Claims, 6 Drawing Sheets

(56) References Cited

U.S. PATENT DOCUMENTS

| | | | |
|---|---|---|---|
| 7,481,399 B2 | 1/2009 | Nöhren et al. | |
| 7,625,048 B2 * | 12/2009 | Rouhana | B60R 22/02 297/484 |
| 7,677,598 B1 * | 3/2010 | Ryan | B60R 21/18 280/730.2 |
| 8,282,163 B2 * | 10/2012 | Cech | A47C 7/62 297/217.2 |
| 8,777,323 B2 * | 7/2014 | Merrill | B64D 25/06 180/268 |
| 8,781,705 B1 | 7/2014 | Reisenberger | |
| 9,120,448 B2 * | 9/2015 | Nagasawa | B60R 21/01544 |
| 2005/0206152 A1 * | 9/2005 | Delventhal | B60R 22/3413 280/805 |
| 2007/0182534 A1 * | 8/2007 | Gregory | B60R 22/48 340/457.1 |
| 2007/0267212 A1 * | 11/2007 | Nachbauer | B60R 16/0207 174/70 R |
| 2008/0018156 A1 * | 1/2008 | Hammarskjold | B60N 2/688 297/354.1 |
| 2013/0062144 A1 | 3/2013 | Fleming | |
| 2013/0075155 A1 * | 3/2013 | Kawai | B60R 16/0215 174/70 C |
| 2014/0103627 A1 | 4/2014 | Deckard et al. | |
| 2014/0138942 A1 | 5/2014 | Rouhana | |
| 2014/0167459 A1 | 6/2014 | Merrill et al. | |

FOREIGN PATENT DOCUMENTS

| | | |
|---|---|---|
| GB | 2481586 B | 9/2012 |
| JP | 2004-330975 A | 11/2004 |

\* cited by examiner

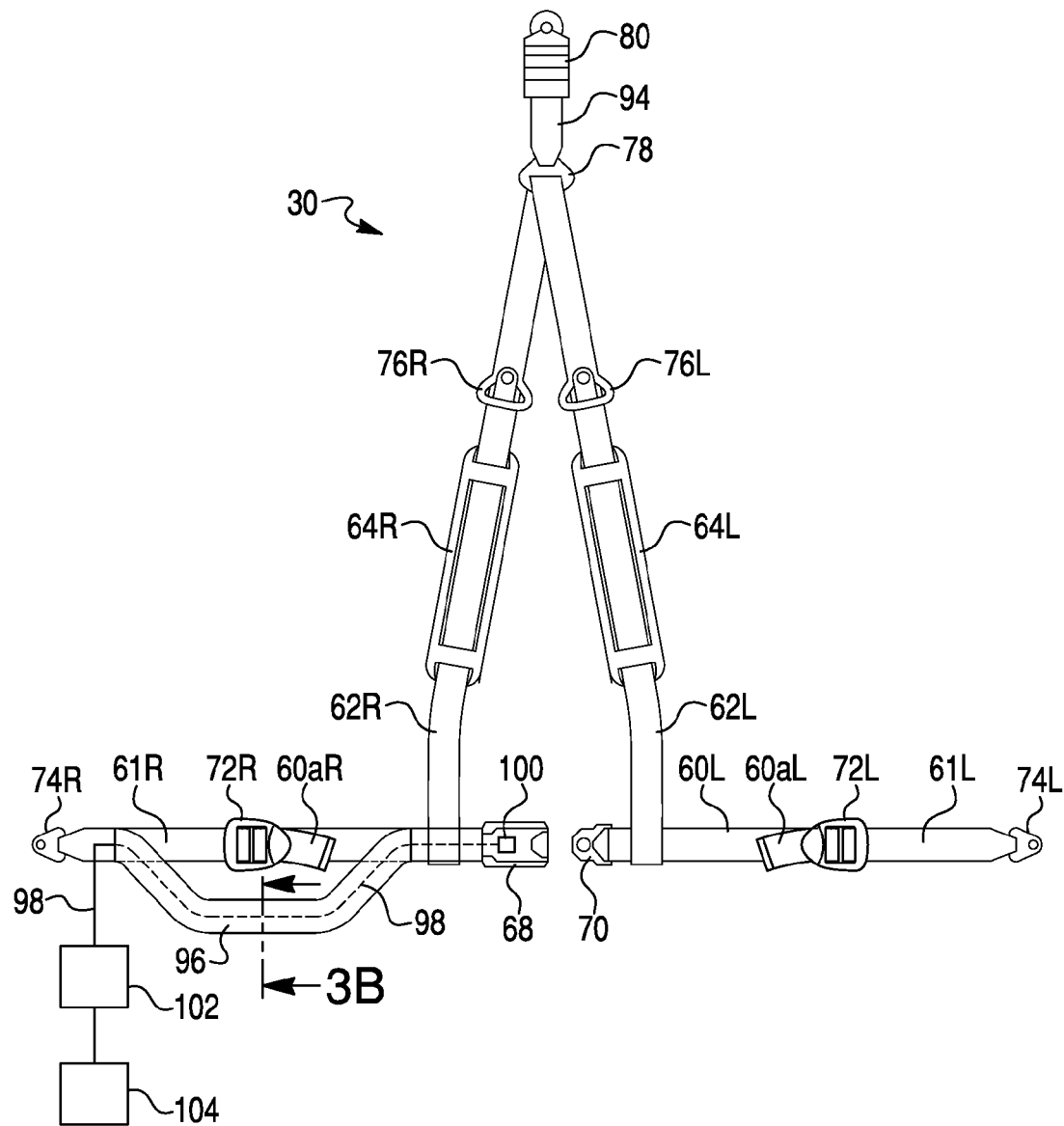

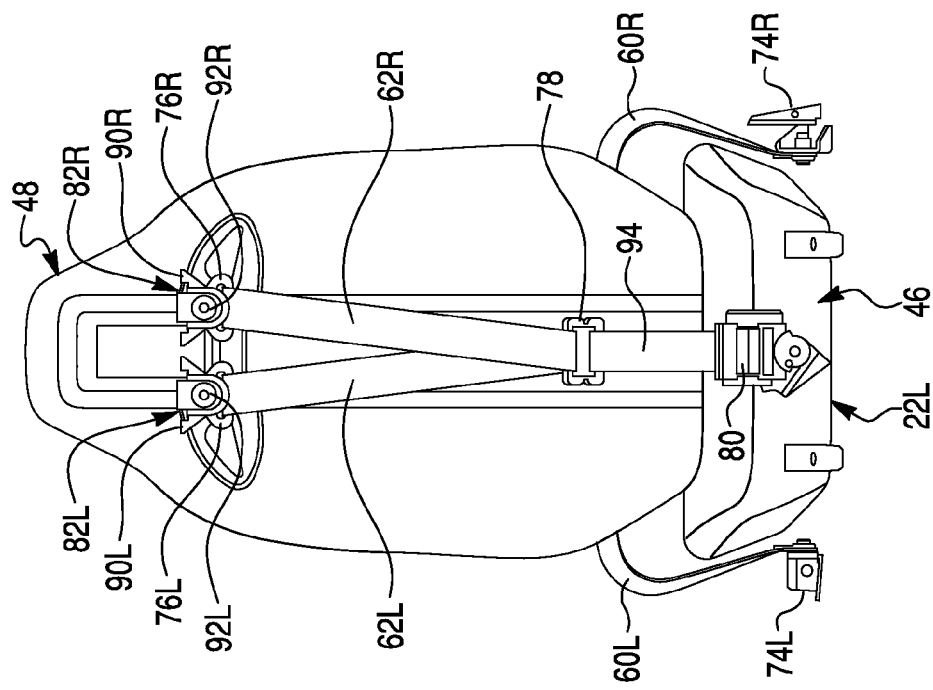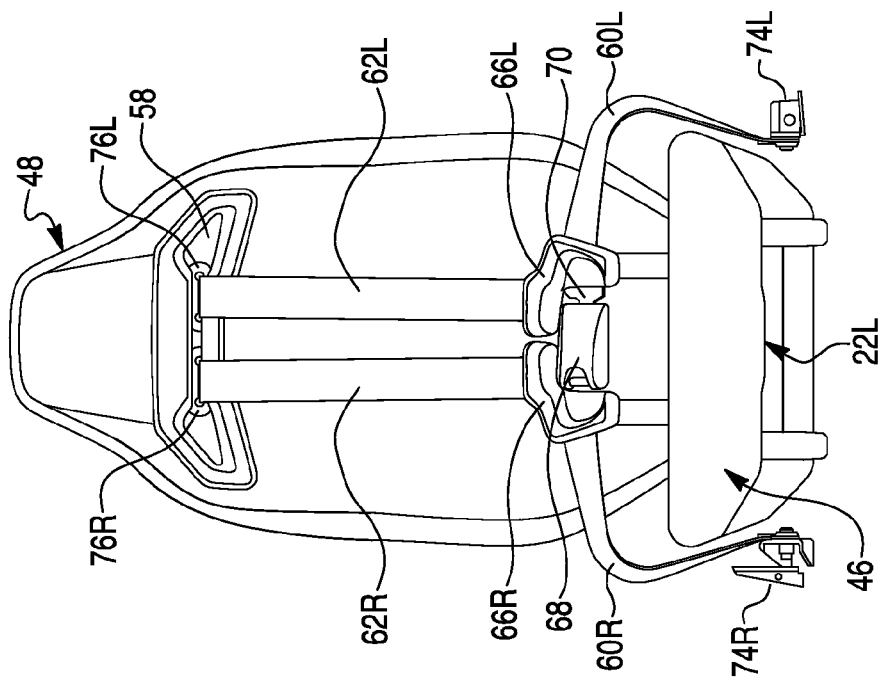

METHODS AND APPARATUS FOR RESTRAINING VEHICULAR PASSENGERS WITH ASSEMBLY INCLUDING FEEDBACK SENSOR

BACKGROUND

The disclosed subject matter relates to methods and apparatus for restraining vehicular passengers. More particularly, the disclosed subject matter relates to vehicular seat belt assemblies, vehicular seating and restraining systems, methods of restraining vehicular passengers, and methods of manufacturing vehicular seat belt assemblies as well as vehicular seating and restraining systems.

Vehicles can be provided with various systems and apparatus for restraining vehicular passengers, such as during an impact event. For example, some related art vehicles are provided with seat belt assemblies that help to restrain the movement of a vehicular passenger in the event of contact with another object or other event that may transmit potentially harmful forces to the passenger. Under these conditions, the seat belt assembly restrains the vehicular passenger to hold the passenger in the passenger's seat to reduce or prevent injuries, such as by impeding or preventing the passenger from contacting other objects, e.g., portions of the vehicle's interior. As one example, in the event of a frontal impact, the forces resulting from the impact could otherwise cause the passenger to move forward and contact a portion of the vehicular interior immediately in front of the passenger. However, the seat belt assembly instead restrains the passenger in the passenger's seat to impede or prevent this contact, thereby reducing, mitigating or preventing passenger injuries.

SUMMARY

Traditional seat belt assemblies, which are still used on many commercial aircraft, utilize a two-point connection system, where opposing strips of webbing extend laterally across a passenger's lap and are removably connected at approximately a midpoint over the passenger's lap, such as via a buckle or other temporary attachment mechanism. The remaining end of each webbing strip is connected to a structural member so as to restrain the passenger while the webbing strips are buckled.

In some cases, the buckling is accomplished by a buckle and a tongue that is configured to communicate with the buckle. For example, the buckle can be disposed at one end of one of the webbing strips, and the tongue can be disposed at one end of the other webbing strip. It may be beneficial for the webbing strip that is attached to the buckle to be of a fixed length, while the webbing strip attached to the tongue may be of variable length to provide adjustability so that passengers of various sizes can be properly fitted.

In some of these embodiments, a sensor can be provided to provide feedback as to whether the buckle is properly attached to the tongue. This feature may be beneficial in various respects, such as to provide a reminder to a vehicular passenger to properly buckle or otherwise secure the seat belt. In some of these embodiments, the sensor can be provided at the buckle, and a wire connecting the sensor to a controller can be disposed along the webbing strip of fixed length.

However, the restraint provided by a two-point connection system is only effective based on contact with the passenger's lap, and thus fails to provide restraint for an upper portion of the passenger's body. Three-point seat belt assemblies, which include a webbing strip extending both laterally across a passenger's lap and diagonally (with a vertical component) across the passenger's shoulder, chest and/or abdomen, may be beneficial by also providing upper body restraint. Three points are connected to structural member(s), including: 1) one end of a buckle assembly (or other temporary attachment mechanism); 2) one end of the webbing strip that extends laterally across the passenger's lap, and 3) the other end of the webbing strip that extends across the passenger's shoulder, chest and/or abdomen.

The third connection point may be provided via a retractor, which is statically connected to the structural member. The retractor can contain an adjustable length of the webbing strip and can apply a biasing force on the webbing strip to maintain tension on the webbing strip, while simultaneously allowing limited motion of the upper torso of the passenger during normal operation of the vehicle. The adjustable length of the webbing strip can accommodate passengers of different sizes and can facilitate buckling and unbuckling of the seat belt assembly. The retractor can enable a tongue (or other temporary attachment mechanism), which is attached to the vertically extending member, to be moved toward or away from, and thereby removably connected to or disconnected from, the buckle assembly.

Once buckled, the retractor can hold in place the webbing strip laterally across the passenger's lap and the webbing strip diagonally across the passenger's shoulder, chest and/or abdomen. The buckle and tongue can be connectable at a location laterally adjacent the passenger, enabling this configuration to provide support for the passenger's lap as well as some level of support for the passenger's upper body. Additionally, during a sudden change in acceleration, such as during an accidental impact event, the retractor can apply an additional force that can draw the webbing strip tight against the passenger's torso and can maintain this additional force until the accidental impact event ends.

A sensor can be provided for these three-point seat belt assemblies for reasons similar to the two-point seat belt assemblies, such as to provide feedback as to whether the buckle is properly attached to the tongue. In some of these embodiments, the sensor can be provided at the buckle, which may be disposed at an end of a webbing strip of fixed length, and a wire connecting the sensor to a controller can be disposed along that webbing strip.

However, three-point seat belt assemblies may not provide sufficient performance in some applications, such as for off-road vehicles, including but not limited to single seat 4-wheel all-terrain-vehicles (ATVs), multiple-seat ATVs, dune buggies, etc., that can travel across rough terrain. As a result, the passengers can bounce around in the seat while remaining restrained by the seat belt assembly, and under such conditions, a passenger can perceive a three-point seat belt assembly as uncomfortable.

Thus, it may be beneficial to provide a multiple point seat belt assembly, as well as related methods of using and manufacturing, that provide support for the passenger's lap as well as more significant support for the passenger's upper body. For example, it may be beneficial to provide webbing strips that extend laterally across the passenger's lap, as well as multiple, and in some cases two, vertically extending webbing strips to provide enhanced support for the passenger's upper body. This enhanced support can be provided by securing one end of each laterally extending webbing strip to a structural component (with the opposite ends being removably connectable to each other such as via a buckle and tongue), and also securing one end of each vertically extending webbing strip to a respective one of the laterally extending webbing strips.

It may also be beneficial to facilitate webbing strip length adjustment, e.g., to facilitate connecting/disconnecting the buckle and tongue, to snuggly fit against the lap and/or torso of the seat occupant, or to provide an advantageous restraint force during an impact event, such as via a retractor. In many of these embodiments, the lengths of both webbing strips will be adjustable to enable passengers of different sizes to be properly buckled.

As with the two and three-point seat belt assemblies, it may be beneficial to incorporate a sensor, such as to provide feedback as to whether the buckle is properly attached to the tongue. A wire can connect the sensor, which can be provided at the buckle, to a controller. However, because both webbing strips are adjustable in length, it may be challenging to dispose the wire along the length of either adjustable webbing strip. For example, adjustment of the webbing strip can communicate a force to the wire, thereby causing the wire to become disconnected from the controller and/or the sensor. It may also be disadvantageous to extend the wire in an unprotected manner, e.g., spaced from the webbing strips, which may result in the wire being subjected to inadvertent pulling or catching that can break or damage the wire, or otherwise cause the wire to be disconnected from the sensor and/or controller. It may therefore be beneficial to provide apparatus and methods for protecting a wire extending from the sensor for the multiple point seat belt assembly disclosed above.

Some embodiments are therefore directed to a vehicular seat belt assembly for restraining a vehicular passenger disposed in a seat upon application of a force applied to the passenger, the restraint being performed via cooperation with a vehicular support structure and based at least in part by contact with the passenger's lap and upper body. The vehicular seat belt assembly can include a pair of lateral webbing strips configured to extend laterally across the passenger's lap and that each define distal and proximal ends, the distal end of each lateral webbing strip being statically secured to the vehicular support structure, and the proximal ends being manually connectable and dis-connectable from each other. A vertically extending webbing strip can include a pair of upper body strips that are configured to contact opposite sides of a front of the passenger's upper body, a proximal end of each upper body strip being connected to a respective one of the lateral webbing strips.

A sensor can be configured to provide data indicative of whether the proximal ends of the pair of lateral webbing strips are connected together. A harness assembly can include a harness webbing that is attached to one of the pair of lateral webbing strips, and a wire harness that is connectable to the sensor, the wire harness being disposed so as to extend along the harness webbing.

Some other embodiments are directed to a vehicular seating and restraint system for restraining a vehicular passenger upon application of a force applied to the passenger, the restraint being performed via cooperation with a vehicular support structure and based at least in part by contact with the passenger's lap and upper body. The vehicular seating and restraint system can include a seat that includes an upper portion defining an aperture and opposing front and back sides, the front side being configured to support the passenger's upper body, and a vehicular seat belt assembly. The vehicular seat belt assembly can include a lap restraint assembly that includes a pair of lap anchors and a pair of lateral webbing strips that are configured to extend laterally across the passenger's lap and that each define distal and proximal ends, the distal end of each lateral webbing strip being statically secured to the vehicular support structure by one of the lap anchors, and the proximal ends being manually connectable and dis-connectable from each other. A vertically extending webbing strip can include a pair of upper body strips that are configured to contact opposite sides of a front of the passenger's upper body and extend through the aperture of the seat, a proximal end of each upper body strip being connected to a respective one of the lateral webbing strips.

A sensor can be configured to provide data indicative of whether the proximal ends of the pair of lateral webbing strips are connected together. A harness assembly can include a harness webbing that is attached to one of the pair of lateral webbing strips, and a wire harness that is connectable to the sensor, the wire harness being disposed so as to extend along the harness webbing.

Still other embodiments are directed to a method of configuring a vehicular seat belt assembly to enable restraint of a vehicular passenger disposed in a seat upon application of a force applied to the passenger. The method can include: extending a pair of lateral webbing strips laterally across a lower portion of the seat such that proximal ends of the lateral webbing strips are manually connectable to and dis-connectable from each other; statically securing a distal end of each lateral webbing strip to a vehicular support structure; disposing a vertically extending webbing strip, which includes a pair of upper body strips, such that the upper body strips extend over opposite sides of a front of an upper portion of the seat; connecting a proximal end of each upper body strip to a respective one of the lateral webbing strips; and configuring a sensor to provide data indicative of whether the proximal ends of the pair of lateral webbing strips are connected together.

The method can also include: attaching a harness webbing to one of the pair of lateral webbing strips; connecting a wire harness to the sensor; and disposing the wire harness so as to extend along the harness webbing.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 3A is a front view of an exemplary seat belt assembly in accordance with the disclosed subject matter.

FIG. 5 is a front view of the exemplary seating and restraint system of FIG. 4.

FIG. 6 is a rear view of the exemplary seating and restraint system of FIG. 4.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Figure 1:
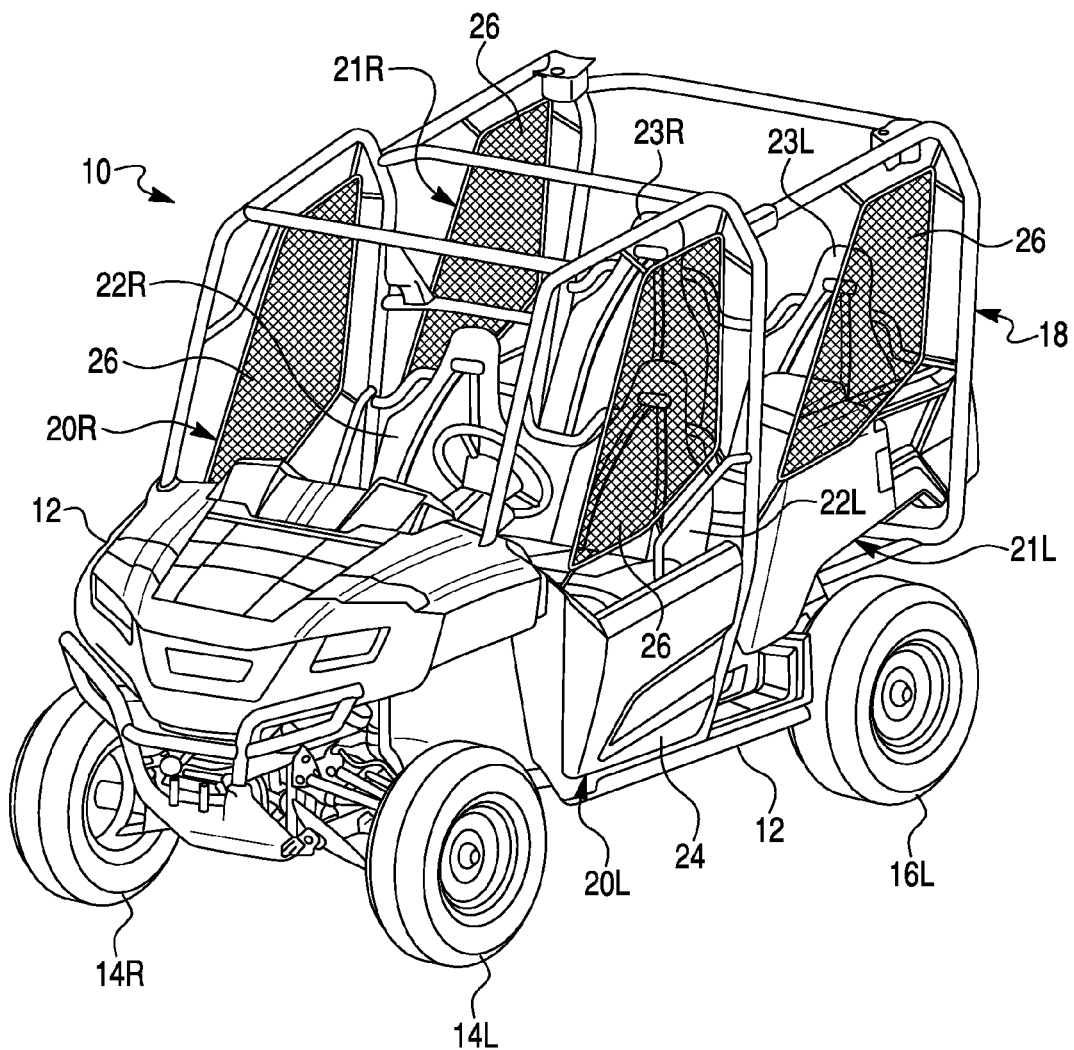
FIG. 1 is a perspective view of an exemplary vehicle including a seating and restraint system with a seat belt assembly in accordance with the disclosed subject matter.

FIG. 1 is a perspective view of an exemplary vehicle 10 including a seating and restraint system with a seat belt assembly in accordance with the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (S×S, or S×S ATV).

However, the disclosed seating and restraint system with seat belt assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc. In fact, embodiments are intended to include or otherwise cover configurations of the seating and restraint system with seat belt assembly for use in any other type of vehicle, such as an aircraft, boat, ship, train, spacecraft, etc. Some other embodiments can be used in non-vehicular applications, such as for amusement park rides, playground apparatus, or any other situation where a seating and restraint system can enhance outcomes subsequent to transmission of a force.

Figure 2:
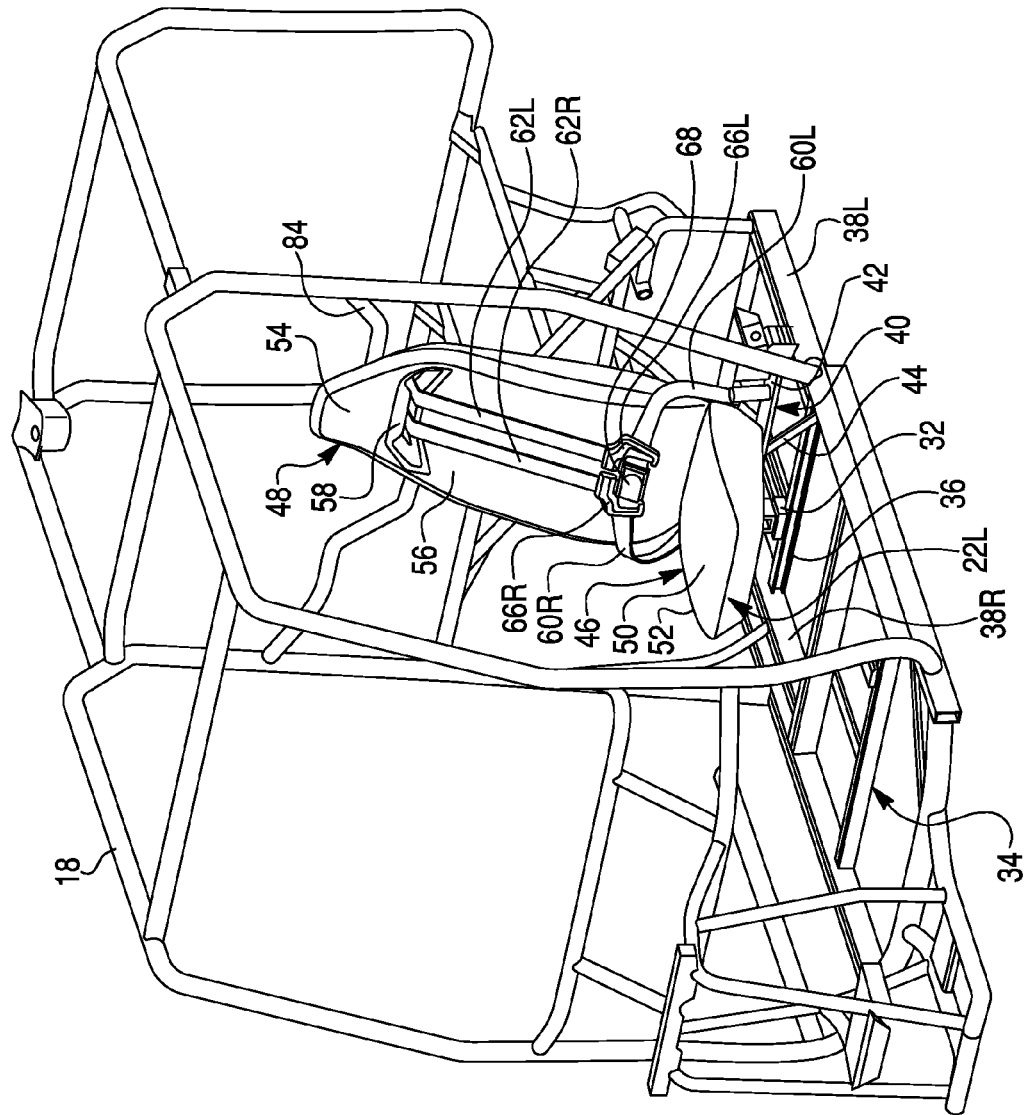
FIG. 2 is a perspective view of the vehicle of FIG. 1 in a partially assembled state.

The vehicle 10 can include a body 12, a pair of front wheels, 14L, 14R, a pair of rear wheels 16L, 16R (the right-side rear wheel 16R is obstructed from view), a roll cage 18, a pair of front door assemblies 20L, 20R, a pair of rear door assemblies 21L, 21R, a frame assembly, and a powertrain. The frame assembly is hidden from view in FIG. 1 by the body 12 (but portions thereof are shown in FIG. 2), and the powertrain is omitted from FIG. 1 for simplicity and clarity of the drawing.

The vehicle 10 can include a pair of front seats 22L, 22R and a pair of rear seats 23L, 23R mounted in a passenger area of the vehicle 10. The roll cage 18 can be configured to extend around and above the seats 22L, 22R, 23L, 23R and the passenger area. The roll cage 18 can cooperate with the body 12 and/or at least a portion of the frame assembly to define a pair of door openings through which a passenger may pass in order to enter or exit the passenger area.

The door assemblies 20L, 20R, 21L, 21R each can include a door 24 and window panel assembly 26, and can be configured to selectively open and close access through the door openings by moving between a closed position and a fully opened position. In the closed position, the door assemblies 20L, 20R, 21L, 21R can span the respective door openings to obstruct access to the passenger area via the door openings. In the closed position, the front portion of each door assembly 20L, 20R can be latched to the roll cage 18. The fully opened position can be any position where the door assemblies 20L, 20R, 21L, 21R are pivoted away from the respective door openings to provide substantially unobstructed access to the passenger area via the door openings. FIG. 1 shows the door assemblies 20L, 20R, 21L, 21R in the closed position.

Each seat 22L, 22R, 23L, 23R of the vehicle 10 also can include a vehicular seat belt assembly 30, which is discussed in more detail below.

II. Seat and Seat Supporting Mounts

FIG. 2 is a perspective view of the vehicle 10 shown in FIG. 1 in a partially-assembled state. In FIG. 2, the body 12, the right-side front seat 22R and the rear seats 23L, 23R of vehicle 10, along with other features, are omitted for simplicity and clarity of FIG. 2. It is to be understood that the right-side front seat 22R and the rear seats 23L, 23R can be connected to the vehicle 10 and can interact with a respective vehicular seat belt assembly 30 to provide a vehicular seating and restraint system as described below with reference to the left-side front seat 22L.

As shown in FIG. 2, the seat 22L can include a lower seat portion 46 (also referred to as a seat bottom) and an upper seat portion 48 (also referred to as a seat back). However, embodiments are intended to include or otherwise cover other types of seats, including seats that do not necessarily define discrete lower and upper portions. For example, some embodiments are directed to seats that include a single unitary or integral structure.

The lower seat portion 46 can include a seat horizontal surface 50 configured to support a passenger's lower body portion. However, this surface does not need to be horizontal, and embodiments are intended to include or otherwise cover surfaces that extend at any angle and that are otherwise capable of supporting a passenger or certain parts of the passenger's body. The lower seat portion 46 also can include a lower seat perimeter extension 52 (also referred to as a hip bolster) that can extend around at least a portion of the perimeter of the seat horizontal surface 50. The lower seat perimeter extension 52 shown in FIG. 2 can extend higher above the seat horizontal surface 50 at its mid-point than at the front and rear, and can enhance passenger stability and/or comfort. However, embodiments are intended to include other alternative structures, as well as seats 22L that do not include this feature at all.

The upper seat portion 48 can include a seat vertical surface 54 configured to support a passenger's upper body portion. However, this surface does not need to be vertical, and embodiments are intended to include or otherwise cover surfaces that extend at any angle and that are otherwise capable of supporting a passenger or certain parts of the passenger's body. The upper seat portion 48 also can include an upper seat perimeter extension 56 (also referred to as a side bolster) that extends around at least a portion of the perimeter of the seat vertical surface 54. The upper seat perimeter extension 56 shown in FIG. 2 can be configured to enhance passenger stability and/or comfort. However, embodiments are intended to include other alternative structures, as well as seats 22L that do not include this feature at all.

Embodiments are intended to include or otherwise cover any structure for connecting the seat 22L to any relevant part of the vehicle 10. In the embodiment shown in FIG. 2, the seat 22L can be connected to a vehicle frame 34 such that the seat 22L and frame 34 do not move relative to each other. However, the seat 22L of other embodiments can be connected to the frame 34 so as to be movable relative to the frame 34, such as a seat that can slide along a track between a plurality of lockable positions, or movable in other ways such as in the case of an arcade game, simulator, etc.

In FIG. 2, the vehicle frame 34 can include a frame cross-bar 36 and longitudinally extending frame members 38L, 38R. The longitudinally extending frame members 38L, 38R can extend generally parallel to each other, and the frame cross-bar 36 can extend generally perpendicular thereto. Opposite ends of the frame cross-bar 36 can be connected to the longitudinally extending frame members 38L, 38R.

A lower surface of the seat 22L can be connected to the frame cross-bar 36 by a center seat mount assembly 32. More particularly, an upper surface of the center seat mount assembly 32 can be connected to a lower surface of the lower seat portion 46 at or near its front end. A lower surface of the center seat mount assembly 32 can be connected to an upper surface of the frame cross-bar 36, which thereby can connect the seat 22L to the vehicle frame 34.

The seat 22L also can be connected to the vehicle frame 34 or other vehicular structural elements via a rear seat mount assembly 40. The rear seat mount assembly 40 can include a rear cross-bar support member 42 that can be connected to the lower surface of the lower seat portion 46 at or near its rear end. The rear cross-bar support member 42 can be connected to the vehicle frame 34 or other vehicular structural element(s) via a rear vertical support member 44.

The seat 22L thereby can be securely connected to the vehicle frame 34 via the center seat mount assembly 32 as well as the rear seat mount assembly 40. However, as indicated above, embodiments are intended to include or otherwise be used with any other relevant seat configuration, seat attachment configurations, etc.

III. Overall Seat Belt Assembly

FIG. 3A is a front view of the exemplary vehicular seat belt assembly 30 in usable with the vehicle 10 of FIGS. 1 and 2. The disclosed vehicular seat belt assembly 30 can be configured to restrain a vehicular passenger disposed in the seat 22L upon application of a force applied to the passenger. As discussed in detail below, the restraint can be performed at least in part by contact with first and second portions of the passenger (for example, the passenger's lap and upper body).

The vehicular seat belt assembly 30 can include a pair of upper lap webbing strips 60L, 60R configured to extend laterally across the passenger's lap. A pair of lap webbing length adjusters 72L, 72R connects the upper lap webbing strips 60L, 60R to a pair of lower lap webbing strips 61L, 61R. The length of the upper lap webbing strips 60L, 60R is manually adjustable by the lap webbing length adjusters 72L, 72R to enable users of different sizes to be properly fitted. A distal end of each of the lower lap webbing strips 61L, 61R can be statically secured to a vehicular support structure, and proximal ends of the upper lap webbing strips 60L, 60R can be configured to be manually and selectively connected to and disconnected from each other. Each of the upper webbing strips 60L, 60R can include an adjustable portion 60aL, 60aR that can extend through a respective one of the length adjusters 72L, 72R so that the length of the upper webbing strips can be selectively increased and decreased.

The upper and lower lap webbing strips 60L, 60R, 61L, 61R can be formed of any appropriate material currently available or later developed that enables performance of their functions. For example, it could be advantageous to form the upper and lower lap webbing strips 60L, 60R, 61L, 61R from a flexible material that: 1) will not break or otherwise fail upon application of predictable forces; 2) be sufficiently resistant to wear or other challenges caused by periodic usage; and 3) provide a sufficient level of comfort to passengers.

Embodiments are intended to include or otherwise cover any appropriate mechanism for securing the distal ends of the lower lap webbing strips 61L, 61R to any vehicular support structure, such as the vehicle frame 34. In the embodiment of FIG. 3A, lap webbing anchors 74L, 74R can be provided at the distal ends of the lower lap webbing strips 61L, 61R to facilitate this connection. As shown in FIGS. 5 and 6, the lap webbing anchors 74L, 74R can be secured to the vehicle frame 34 by brackets. However, as indicated above, embodiments are intended to cover any known, related art, or later developed technique for performing this rigid connection.

Embodiments are intended to include or otherwise cover any mechanism for enabling the proximal ends of the upper lap webbing strips 60L, 60R to be manually and selectively connected to and disconnected from each other. In the embodiment of FIG. 3A, a buckle 68 can be provided at the proximal end of one of the upper lap webbing strips 60L, 60R, while a tongue 70 can be provided at the proximal end of the other of the upper lap webbing strips 60L, 60R. The buckle 68 and tongue 70 can be configured to be manually connectable to each other. For example, the tongue 70 can be received into an aperture in the buckle 68, and upon extending a certain distance within the aperture engages internal component(s) of the buckle 68 to be locked thereto. The buckle 68 also can include a manually actuable release mechanism that enables an operator to unlock the buckle 68 and tongue 70 from each other and thereby enable the proximal ends of the upper lap webbing strips 60L, 60R to be separated.

The upper lap webbing strips 60L, 60R can include any other or additional apparatus for enabling adjustment of their lengths, such as to provide for passengers of different sizes. For example, the buckle 68 can be configured to enable lengths of the upper lap webbing strips 60L, 60R to be increased or shortened so that the buckle 68 and tongue 70 can be locked together over the laps of different sized passengers. The lengths of the upper lap webbing strips 60L, 60R can also be increased or shortened after the buckle 68 and tongue 70 are locked together to enable adjustment of the upper lap webbing strips 60L, 60R, such as to provide for tightening or loosening.

The vehicular seat belt assembly 30 can also include a vertically extending webbing strip including a pair of shoulder webbing strips 62L, 62R that are configured to contact opposite sides of a front of the passenger's upper body. A proximal end of each of the shoulder webbing strips 62L, 62R can be connected to one of the upper lap webbing strips 60L, 60R. Embodiments are intended to include or otherwise cover any appropriate mechanism for attaching the shoulder webbing strips 62L, 62R to the upper lap webbing strips 60L, 60R, such as by stitching. However, embodiments are intended to cover other known, related art or later developed attaching techniques, such as by rivets, clips, glue, epoxy, etc.

The shoulder webbing strips 62L, 62R can be connected to the upper lap webbing strips 60L, 60R either directly or indirectly. In embodiments where these elements are connected indirectly, any other device can be used as an intermediary connector. For example, the shoulder webbing strips 62L, 62R can be connected to the upper lap webbing strips 60L, 60R via one or more brackets. In fact, in some embodiments, each of the shoulder webbing strips 62L, 62R is connected to a bracket, and that bracket is attached to one of the buckle 68 and the tongue 70. In some of these embodiments, the upper lap webbing strips 60L, 60R are also attached to the brackets. Thus, one bracket is attached to one shoulder webbing strip and one upper lap webbing strip, and another bracket is attached to the other shoulder webbing strip and the other upper lap webbing strip. The one bracket is then attached to the buckle 68, and the other bracket is attached to the tongue 70.

The shoulder webbing strips 62L, 62R can be formed of the same material as the upper and lower lap webbing strips 60L, 60R, 61L, 61R. However, the shoulder webbing strips 62L, 62R can be formed of any other material currently available or later developed that enables performance of their functions. For example, it would be advantageous to form the shoulder webbing strips 62L, 62R from any other flexible material that: 1) will not break or otherwise fail upon application of predictable forces; 2) be sufficiently resistant to wear or other challenges caused by periodic usage; and 3) provide a sufficient level of comfort to passengers.

Each of the shoulder webbing strips 62L, 62R can be provided with a shoulder/chest pad 64L, 64R for any advantageous purpose, such as to enhance passenger comfort or to enhance the ability of the shoulder webbing strips 62L, 62R to retain the passenger in place. In the embodiment of FIG. 3A, the shoulder/chest pads 64L, 64R each define a width that is greater than a width of the corresponding shoulder webbing strips 62L, 62R. This greater width increases the surface area in contact with the passenger's upper body to perform the advantages cited above.

The shoulder/chest pads 64L, 64R can be configured to facilitate or enhance any of the above or other advantages. For example, the shoulder/chest pads 64L, 64R can be provided with padding to enhance passenger comfort. The shoulder/chest pads 64L, 64R can also be disposed at an appropriate location to facilitate or enhance any of the above or other advantages. For example, the shoulder/chest pads 64L, 64R can be positioned to contact a portion of the passenger's upper body that will enhance comfort and/or reduce, impede or prevent injuries should the passenger experience a force and thereby be retained in the seat 22L at least in part by virtue of contact with the shoulder/chest pads 64L, 64R.

In the embodiment shown in FIG. 3A, the shoulder webbing strips 62L, 62R form a unitary vertically extending webbing strip. The shoulder webbing strips 62L, 62R can meet at a webbing ring 78 that enables the unitary vertically extending webbing strip to change its direction of extension, and thereby form the separate shoulder webbing strips 62L, 62R and form at least in part a V-shaped configuration. Embodiments are intended to include or otherwise cover any type of webbing ring 78 that enables the unitary vertically extending webbing strip to change its direction of extension. In the embodiment shown in FIG. 3A, the webbing ring 78 can define a channel through which the unitary vertically extending webbing strip extends to facilitate its change of direction of extension.

The vehicular seat belt assembly 30 can include guides that help to guide the upper lap webbing strips 60L, 60R and/or shoulder webbing strips 62L, 62R into desired extension directions and/or orientations. For example, in the embodiment shown in FIGS. 2 and 5, a lower restraint/guide 66L, 66R can be provided at each side of the buckle 68 and tongue 70. In particular, each lower restraint/guide 66L, 66R can be C-shaped and disposed adjacent the proximal end of one of the lateral webbing strips. Each C-shaped lower restraint/guide 66L, 66R can define a pair of apertures that are configured such that a respective one of the upper lap webbing strips 60L, 60R extends through one of the pair of apertures and a respective one of the shoulder webbing strips 62L, 62R extends through the other aperture.

The vehicular seat belt assembly 30 also can include an anchor that is positioned and configured to guide each of the shoulder webbing strips 62L, 62R so as to enable a change in a direction of extension of the shoulder webbing strips 62L, 62R, and to thereby absorb a portion of a load created by the force applied to the passenger and applied to the shoulder webbing strips 62L, 62R. In the embodiment shown in FIG. 3A, the anchor can include a pair of D-Ring anchors 76L, 76R. One of the D-Ring anchors 76L, 76R can be provided for each of the shoulder webbing strips 62L, 62R. For example, each of the shoulder webbing strips 62L, 62R can extend through an aperture defined in a respective one of the D-Ring anchors 76L, 76R. As discussed in detail below with regard to FIGS. 4-6, the D-Ring anchors 76L, 76R can be statically secured to the vehicular support structure, which can enable the D-Ring anchors 76L, 76R and vehicular support structure to absorb a portion of a load created by the force applied to the passenger and applied to the shoulder webbing strips 62L, 62R.

However, embodiments are intended to include or otherwise cover any other anchoring apparatus that can perform the above operations, including currently available or later developed structures. For example any type of anchor can be used that enables a change in a direction of extension of the shoulder webbing strips 62L, 62R, while also absorbs a portion of a load created by the force applied to the passenger and applied to the shoulder webbing strips 62L, 62R.

The vehicular seat belt assembly 30 also can include a retractor assembly that can be configured to enable length adjustment of the shoulder webbing strips 62L, 62R under certain circumstances. For example, the retractor assembly can be configured to limit or disable length adjustment of the shoulder webbing strips 62L, 62R if a load is applied to the passenger and/or shoulder webbing strips 62L, 62R that exceeds a certain level. In other words, the retractor assembly can be configured to apply a force to the shoulder webbing strips 62L, 62R so that they tighten against the passenger during an impact event and remain so until the impact event ends.

For example, if the passenger and/or shoulder webbing strips 62L, 62R are subject to significant forces, such as those created by a vehicular impact event, the retractor assembly can impede length adjustment of the shoulder webbing strips 62L, 62R and in fact can hold the shoulder webbing strips 62L, 62R in place to facilitate retention of the passenger in the seat 28. Alternatively, if the load is applied to the passenger and/or shoulder webbing strips 62L, 62R does not exceed a certain level, then the retractor assembly can be configured to enable length adjustment of the shoulder webbing strips 62L, 62R. For example, the length of the shoulder webbing strips 62L, 62R can be adjusted for comfort under normal operating conditions of the vehicle 10.

In some embodiments, the retractor assembly can be configured to automatically take up slack so that the shoulder webbing strips 62L, 62R automatically fit different sized passengers. This feature also can facilitate passenger comfort while the vehicular seat belt assembly 30 is buckled and while a significant load is not being applied to the passenger and vehicular seat belt assembly 30. For example, the retractor assembly can enable the length of the shoulder webbing strips 62L, 62R to change, which enables the passenger to move around in the passenger's seat, thereby facilitating freedom of movement.

In the embodiment of FIG. 3A, the retractor assembly can include a retractor 80 and an intermediate webbing 94. The retractor 80 can perform the operations disclosed above with regard to adjustability/locking of the lengths of the shoulder webbing strips 62L, 62R. In the embodiment shown in FIG. 3A, the retractor 80 is connected to the webbing ring 78, and thereby the shoulder webbing strips 62L, 62R, by the intermediate webbing 94. However, embodiments are intended to include or otherwise cover any other type or method of attaching (directly or indirectly) the retractor 80 to the shoulder webbing strips 62L, 62R. For example, many embodiments do not include the webbing ring 78. Thus, in some embodiments, the intermediate webbing 94 or the retractor 80 is directly connected to the shoulder webbing strips 62L, 62R, such as by stitching or sewing. In other embodiments that do not include the webbing ring 78, the intermediate webbing 94 or the retractor 80 is attached to the shoulder webbing strips 62L, 62R via other apparatus. In fact, embodiments are intended to include or otherwise cover any other known, related art or later developed apparatus for performing any of the above operations of the retractor assembly.

IV. Sensor Assembly

Various other features, operations, etc., can be added to the seat belt assembly 30 disclosed above. For example, some embodiments include a sensor assembly that is configured to provide some type of data. In some of these embodiments, the sensor assembly provides data that is directly or indirectly related to the seat belt assembly 30. For example, the sensor assembly can provide data as to whether the mechanism for releasably securing the lap webbing strips 60L, 60R together is in its secured state, e.g., whether the tongue 70 is secured to the buckle 68. However, the sensor assembly can be configured to provide any other data that is directly or indirectly related to the seat belt assembly 30. In fact, embodiments are intended to include or otherwise cover seat belt assemblies that provide data that is not directly or indirectly related to the seat belt assembly 30.

Still other embodiments are directed to sensor assemblies that are configured to operate with other apparatus, such as other sensors, data from such other sensors, and/or other data. For example, in some embodiments, the sensor apparatus is used with sensor(s) that are configured to determine whether a passenger is seated or otherwise disposed in the relevant seat 22L, 22R or other passenger area. In some of these embodiments, a weight sensor determines whether a passenger is disposed in the seat by virtue of whether a sufficient weight/force is applied to the seat horizontal surface 50.

The sensor assembly can then take this data into account in a variety of ways. For example, an indication or reminder to manipulate the seat belt assembly 30 into the secured position (such as by securing the tongue 70 to the buckle 68) may only be provided if both: 1) the sensor assembly determines that the tongue 70 is not secured to the buckle 68; and 2) the other sensor(s) determine that a passenger is seated in the seat 22L, 22R. In other words, the reminder may not be provided if the passenger is not seated in the seat 22L, 22R, even if the sensor assembly determines that the tongue 70 is not secured to the buckle 68. This feature may be beneficial for a variety of reasons, such as to only notify the passenger or other relevant individuals in relevant situations, and to thereby avoid providing the notification in irrelevant situations, such as in the case where no passenger is disposed in the seat 22L, 22R.

As shown in FIG. 3A, the sensor assembly includes a sensor 100 disposed at the buckle 68. Embodiments are intended to include any known, related art or later developed sensor that is configured to determine whether the tongue 70 is secured to the buckle 68. For example in some of these embodiments, securing the tongue 70 to the buckle 68 causes an electric circuit to close, which can be detected by the sensor 100 to thereby determine whether the tongue 70 is secured to the buckle 68.

In some embodiments, the sensor 100 is disposed within the buckle 68. However, embodiments are intended to include or otherwise cover disposing the sensor 100 at any location at the buckle 68, including at interior or exterior locations. In fact, in some embodiments, the sensor 100 is spaced from the buckle 68. For example, in some of these embodiments, the sensor 100 is disposed at the tongue 70.

As shown in FIG. 3A, the sensor 100 can transmit a signal to a controller 102 that is spaced from the buckle 68 and/or other elements of the seat belt assembly 30. Thus, in this embodiment, the sensor 100 is separate from the controller 102. However, the controller of other embodiments may be disposed at the sensor 100 or buckle 68. In some of these embodiments, the sensor 100 and controller 102 can form a single integral or unitary apparatus.

Embodiments are intended to include or otherwise cover any known, related art or later developed technologies for transmitting the data from the sensor 100 to the controller 102. In the embodiment shown in FIG. 3A, the data is transmitted via a wire harness 98. In some of these embodiments, the wire harness 98 includes one or any number of separate wires. Embodiments are intended to include or otherwise cover any type or types of wires. In fact, the wire harness 98 can instead or additionally include fiber optic cable, or any other medium for transmitting the data. In fact, in some embodiments, the sensor transmits some or all of the data wirelessly, and thus some of these embodiments do not include a wire harness 98. However, as discussed elsewhere herein, many of the disclosed embodiments include sensors with wires, and provide beneficial methods and apparatus for protecting the wiring.

Embodiments are also intended to include or otherwise cover other types of data transmissions as an alternative or in addition to the sensor 100 transmitting data to the controller 102. For example, some embodiments are configured to enable the controller 102 to transmit data to the sensor 100, thereby enabling two-way communication between the sensor 100 and the controller 102.

Embodiments are intended to include or otherwise cover any usage of the data transmitted from the sensor 100 to the controller 102. For example, in some embodiments, the controller 102 transmits a signal to an indicator 104 that may be based on the data received from the sensor 100. In some of these embodiments, if the data received from the sensor indicates that the tongue 70 is not secured to the buckle 68, the controller 102 transmits a corresponding signal to the indicator 104. Upon receipt of this corresponding signal, the indicator 104 provides an indication to communicate that the seat belt assembly 30 is in an unsecured state, i.e., the tongue 70 is not secured to the buckle 68.

Embodiments are intended to include or otherwise cover any known, related art or later developed indicator configuration. For example, the indicator 104 can provide its indication via visual, audio, and/or other type(s) of stimulus. Embodiments are also intended to include indicators 104 that provide communications to any type or number of recipients, such as the passenger disposed in the seat, a vehicle operator, another individual (such as a steward, stewardess, etc.), parent (in the case of utilizing the apparatus in a child's car seat), etc. For example, embodiments are intended to include or otherwise cover providing indications to anyone with an interest in understanding or becoming aware that the seat belt assembly 30 is in an unsecured state, i.e., the tongue 70 is not secured to the buckle 68.

In the embodiment shown in FIG. 3A, the indicator 104 is shown as being spaced and separate from the controller 102. However, in other embodiments, the controller 102 and indicator 104 can form a single integral or unitary structure.

As shown in FIG. 3A, a harness webbing 96 is attached to the lap webbing strip 60R. In the embodiment shown in FIG. 3A, one end of the harness webbing 96 is attached to the lap webbing strip 60R adjacent a location where the shoulder webbing strip 62R is attached to the lap webbing strip 60R; and the opposing end of the harness webbing 96 is attached to the lap webbing strip 60R adjacent the lap webbing anchor 74R. Thus, the harness webbing 96 is attached to the lap webbing strip 60R in generally a U-shaped configuration. However, embodiments are intended to include or otherwise cover any other attachment locations or relative dispositions between the harness webbing 96 and the lap webbing strip 60R.

In the embodiment shown in FIG. 3A, the wire harness 98 extends along the harness webbing 96. In some of these embodiments, the wire harness 98 is disposed or oriented at an appropriate location relative to the harness webbing 96 so as to protect the wire harness 98, such as from being damaged, disconnected from the controller 102 and/or sensor 100, etc. For example, this disposition may impede or prevent the wire harness 98 from inadvertent pulling, catching, etc. In some of these embodiments, the wire harness 98 extends along an interior of the harness webbing 96.

Figure 3B:
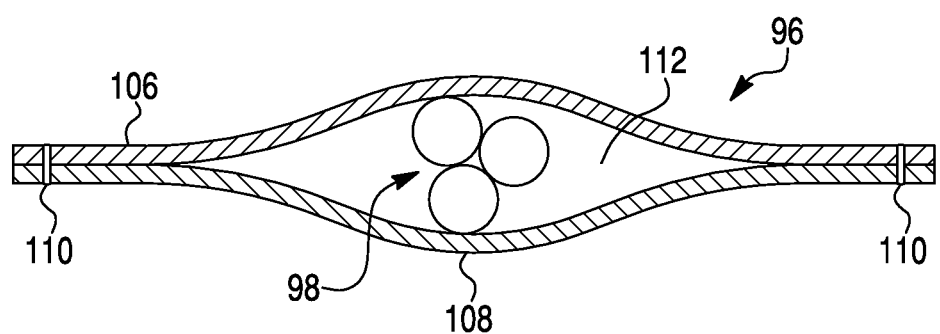
FIG. 3B is a cross-sectional view taken along line 3B of FIG. 3A.

FIG. 3B is a cross-sectional view taken along line 3B of FIG. 3A. As shown in FIG. 3B, the harness webbing 96 includes a first webbing portion 106 and a second webbing portion 108. The first and second webbing portions 106, 108 can be connected together at locations adjacent their respective lateral sides by any known, related art or later developed technique. In the embodiment shown in FIG. 3B, the first and second webbing portions 106, 108 are attached via stitching, as evidenced by seams 110, however, alternative embodiments accomplish this attachment via other mechanical fasteners (such as staples, bolts, etc.), glue, epoxy, etc. In still other embodiments, tube webbing is used and the wiring extends within the tube webbing. In other words, the webbing forms a single tube, and the wires are run within the tube.

A harness pocket 112 is disposed between the lateral sides of the first and second webbing portions 106, 108. The harness pocket 112 constitutes an interior area that is sufficient for the wire harness 98 to travel therethrough. This configuration enables the harness webbing 96 to thereby shield or protect the wire harness 98 as it extends along the length of the harness webbing 96, such as to impede or prevent the inadvertent pulling or catching of the wire harness 98 that may result in damage to the wire harness 98, or disconnection of the wire harness 98 from the sensor 100 or controller 102.

In the embodiment shown in FIG. 3B, the wire harness 98 is shown as including three separate wires. However, embodiments are intended to include or otherwise cover wire harnesses 98 that include any number of wires, including one or multiple wires.

In some embodiments, the length of the harness webbing 96 is greater than or equal to the maximum adjustable length of the lap webbing strip 60R to which it is connected. This feature may be beneficial to impede or prevent damage to the harness webbing 96 and/or the wire harness 98. For example, adjusting the lap webbing strip 60R to a length that is greater than the length of the harness webbing 96 could apply forces, such as opposite pulling forces, to ends of the harness webbing 96 that could damage the harness webbing 96 and/or the wire harness 98. Thus, in some embodiments, the harness webbing 96 is attached to the lap webbing strip 60R in a generally U-shaped configuration, with sufficient slack to handle the maximum adjustable length of the lap webbing strip 60R. In other words, the harness webbing 96 is as long or longer than the lap webbing strip 60R throughout its full adjustment range.

The above embodiments enable the harness webbing 96 to be subjected to various forces as opposed to the wire harness 98. Embodiments are intended to include or otherwise cover alternative or additional features that impede damage to the wire harness 98. For example, in some embodiments, the wire harness 98 is longer than the harness webbing 96, which may be beneficial for a variety of reasons. More specifically, providing the wire harness 98 with slack within the harness webbing 96 further impedes damage to the wire harness 98 if the harness webbing 96 is pulled.

V. Seat Belt Assembly Mounting

Figure 4:
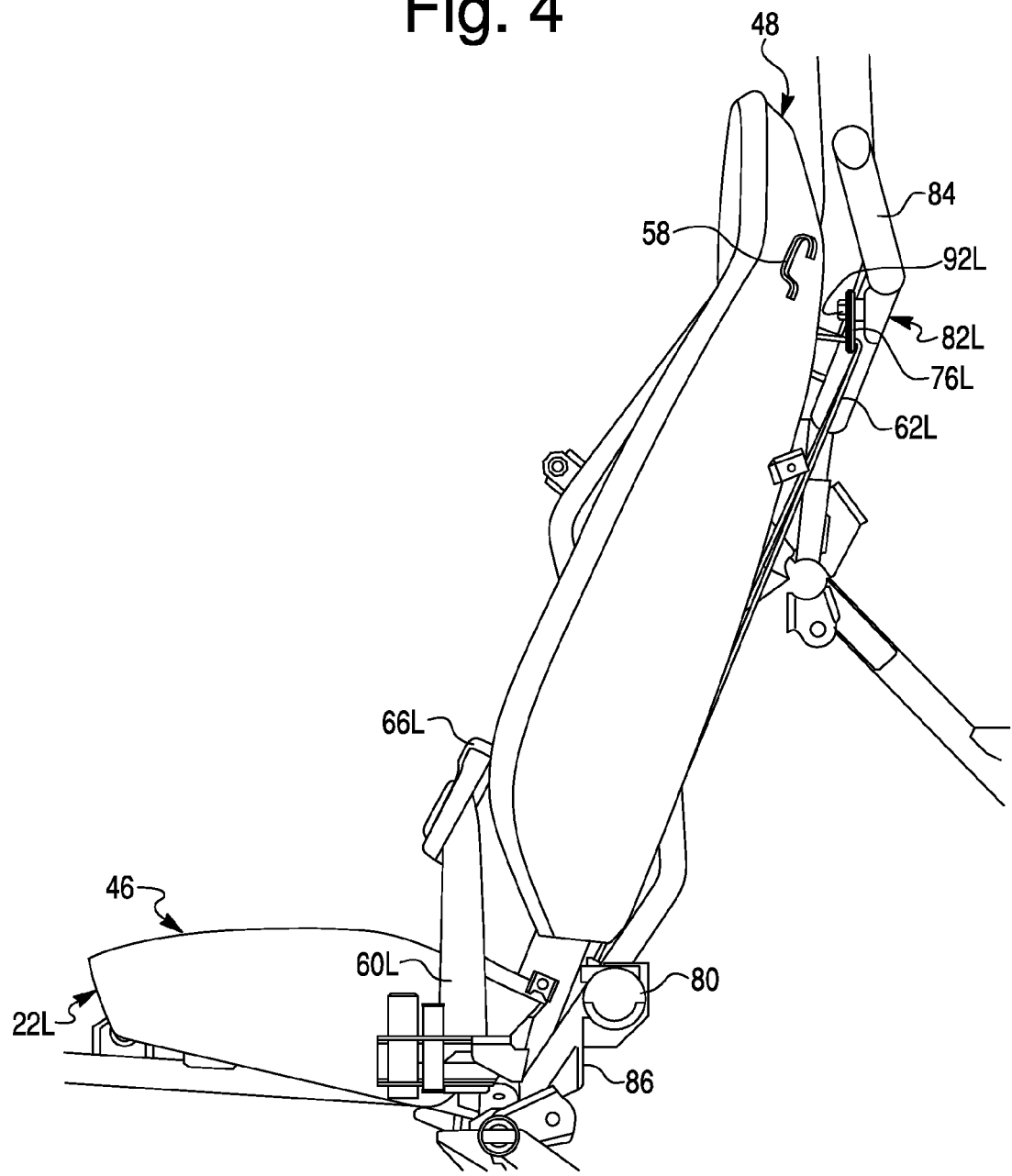
FIG. 4 is a side view of an exemplary seating and restraint system in accordance with the disclosed subject matter.

FIGS. 4-6 are side, front and rear views, respectively, of the exemplary seating and restraint system in accordance with the vehicle 10 shown in FIGS. 1 and 2. FIGS. 4-6 particularly show certain features relevant to mounting of various elements of the seat belt assembly.

As shown in these figures, the shoulder webbing strips 62L, 62R can extend through a seat aperture 58 defined in the upper seat portion 48 of the seat 28. The D-Ring anchors 76L, 76R can be disposed adjacent a rear surface of the upper seat portion 48 of the seat 22L.

As shown in FIG. 4, the D-Ring anchors 76L, 76R can be secured to a structural element of the vehicle, and in particular a mid-roll bar pipe 84. This pipe 84 may also be referred to as a Mid-ROPS (Roll Over Protective Structure). The mid-roll bar pipe 84 can be a load-bearing structural member of the vehicle frame 34 and/or the roll cage 18. The mid-roll bar pipe 84 can be a component of, or otherwise securely connected to, the roll cage 18. In other embodiments, this pipe 84 can be part of the main frame body. In fact, this pipe 84 can be constituted by any cross pipe extending laterally across the vehicle. However, embodiments are intended to cover attaching the D-Ring anchors 76L, 76R to any other appropriate structural element securely connected to the vehicle frame 34 or other relevant element, directly or indirectly.

In the embodiment shown in FIGS. 4-6, the D-Ring anchors 76L, 76R can be secured to the mid-roll bar pipe 84 by a respective D-Ring mounting assembly 82L, 82R. In particular, each D-Ring mounting assembly 82L, 82R can include a D-Ring mounting bracket 90L, 90R and a fastener 92L, 92R. In the embodiment of FIGS. 4-6, each fastener 92L, 92R can be in the form of a threaded bolt that connects the D-Ring mounting bracket 90L, 90R, and thereby the D-Ring anchors 76L, 76R, to the mid-roll bar pipe 84. However, embodiments are intended to include or otherwise cover any other apparatus for attaching the D-Ring anchors 76L, 76R to the mid-roll bar pipe 84 such as but not limited to other mechanical fasteners (rivets, screws, etc.), welding, etc.

As shown in FIGS. 4-6, shoulder webbing strips 62L, 62R can each extend through an aperture defined in one of the D-Ring anchors 76L, 76R, and change their direction of extension at the D-Ring anchors 76L, 76R. This configuration can enable the D-Ring anchors 76L, 76R to absorb a portion of a load created by the force applied to the passenger and applied to the shoulder webbing strips 62L, 62R, and then to communicate this absorbed load to the mid-roll bar pipe 84.

Absorbing this load can be beneficial because it can remove at least a portion of the load that would otherwise be communicated to the passenger due to forces created upon a vehicular impact event. Reducing the load communicated to the passenger can thus impede, reduce or prevent passenger trauma or injuries that would otherwise result from the impact event.

As shown in FIG. 4, the retractor 80 can be secured to the vehicle frame 34 by a retractor anchor 86. Embodiments are intended to include or otherwise cover any apparatus for securing the retractor 80 to the vehicle frame 34 or any other appropriate structural element(s).

VI. Operation

In accordance with the operation of some of the disclosed embodiments, a passenger sits in the seat 22L and connects the buckle 68 to the tongue 70 to lock the upper lap webbing strips 60L, 60R and shoulder webbing strips 62L, 62R in place. The retractor 80 can automatically remove slack in the shoulder webbing strips 62L, 62R to properly fit the passenger. The retractor 80 also can allow for length adjustments of the shoulder webbing strips 62L, 62R while a significant load is not being applied (such as would be caused during an impact with or by another object) to enable the passenger to move around in the seat 22L.

The shoulder webbing strips 62L, 62R can extend vertically over opposing sides of a front of the passenger's upper body, and thereby provide advantageous support of the upper body, even in the event of an impact by or with another object and application to the passenger of the forces caused thereby. In addition, the D-Ring anchors 76L, 76R can absorb a portion of a load created by the force applied to the passenger and applied to the shoulder webbing strips 62L, 62R, and then communicate this absorbed load to the mid-roll bar pipe 84. As indicated above, absorbing this load can be beneficial because it can remove at least a portion of the load that would otherwise be communicated to the passenger, and thereby can impede, reduce or prevent passenger trauma or injuries that would otherwise result from the vehicular impact event. Further, in spite of the significant support provided to the passenger's upper body by the shoulder webbing strips 62L, 62R, the retractor 80 can enable the passenger to freely move in place in the seat 22L while the assembly is buckled, assuming that significant forces are not being applied to the passenger, assembly, etc.

In addition, the sensor 100 transmits a signal to the controller 102 to indicate whether the seat belt assembly 30 is in its secured position, i.e., whether the tongue 70 is secured to the buckle 68. The controller 102 then transmits a corresponding signal to the indicator 104 to indicate whether the tongue 70 is secured to the buckle 68.

The lap webbing strip 60R that is attached to the buckle 68 is adjustable. However, the disposition of the wire harness 98 within the harness webbing 96 impedes or prevents damage to the wire harness 98, such as damage that could occur during adjustment of the lap webbing strip 60R, because the harness webbing 96 is longer than the maximum adjustment range of the lap webbing strip 60R. In addition, disposing the wire harness 98 within the harness pocket 112 impedes or prevents the wire harness 98 from being damaged, such as from inadvertent catching or pulling.

VII. Alternative Embodiments

While certain embodiments of the invention are described above, and FIGS. 1-6 disclose the best mode for practicing the various inventive aspects, it should be understood that the invention can be embodied and configured in many different ways without departing from the spirit and scope of the invention.

The vehicle of FIGS. 1 and 2 can include four seats (while only one seat is illustrated in FIG. 2). Embodiments are intended to include or otherwise cover vehicles having any number of seats. For example, the disclosed and similar seat belt assemblies can be used for vehicular rear seats, seats on buses, trains, airplanes, etc. In fact, the disclosed seat belt assemblies can even be used in non-vehicular applications.

The vehicle 10 of FIGS. 1 and 2 has four seats arranged in two rows. However, embodiments are intended to include or otherwise cover vehicles having any number of seats all arranged in a row, or all arranged in tandem, or arranged in any number of rows. Embodiments are intended to include or otherwise cover a single seat for each vehicle occupant, or a single seat for a plurality of vehicle occupants (also referred to as a bench seat).

The embodiments are disclosed in the context of vehicular seats for adults. However, the disclosed seat belt assemblies can also be used for seats specially designed or configured for infants, children, etc.

In some of the embodiments disclosed in the context of FIGS. 3A-6, the shoulder webbing strips 62L, 62R can be unitary, and thus form a unitary vertically extending webbing strip. However, embodiments are intended to include or otherwise cover other configurations. For example, the shoulder webbing strips 62L, 62R do not need to be unitary, i.e., formed from a single piece of the same material, and instead can be integral or otherwise connected together. Embodiments in which the shoulder webbing strips 62L, 62R are connected together are intended to include or otherwise cover any known, related art or later developed technique for providing this connection, including stitching, rivets, glue, epoxy, etc.

In fact, the shoulder webbing strips 62L, 62R might not be unitary, integral or otherwise connected in any manner. In these embodiments, the shoulder webbing strips 62L, 62R can be completely separate and independent components. In some of these embodiments, a separate retractor assembly can be provided for each respective independent shoulder webbing strip 62L, 62R. Other modifications can also be made to some of the features disclosed above to accommodate the shoulder webbing strips 62L, 62R being independent. For example, separate apertures can be defined in the upper seat portion 48 for the shoulder webbing strips 62L, 62R. In other words, each shoulder webbing strip 62L, 62R can be extended through a separate hole defined in the upper seat portion 48.

In fact, this feature can be provided for the embodiments shown in FIGS. 1-6 that utilize a unitary or integral vertically extending webbing strip. In other words, the single seat aperture 58 of the embodiments shown in FIGS. 1-6 can be modified to be two separate apertures, and a respective one of the shoulder webbing strips 62L, 62R can extend through each aperture.

In the embodiments shown in FIGS. 1-6, the unitary vertically extending webbing strip can include two shoulder webbing strips 62L, 62R that extend in parallel along a generally vertical direction. However, embodiments are intended to include or otherwise cover shoulder webbing strips 62L, 62R that extend in any other direction that may be beneficial for the relevant application. For example, the shoulder webbing strips 62L, 62R may extend in non-parallel directions or be arranged in an asymmetrical pattern about the passenger. In addition, some embodiments include additional lateral webbing strips (such as additional lap webbing strips), some or all of which may provide for the wire protection features disclosed above.

In fact, embodiments are intended to include or otherwise cover any number of shoulder webbing strips 62L, 62R. For example, three, four, or more shoulder webbing strips can be provided in any orientations that are beneficial.

The sensor assembly is disclosed in the context of the multiple point harness, seat belt assembly 30, shown in FIG. 3A. However, some embodiments utilize the sensor assembly in the contexts of other types of seat belt assemblies, such as those where the buckle 68 is attached to an adjustable length of lap webbing strip. However, the disclosed sensor assembly can also be used in contexts where the buckle 68 is attached to a fixed length of lap webbing strip.

In some embodiments, the harness webbing 96 is formed of the same material as the lap webbing strips 60L, 60R, and/or the shoulder webbing strips 62L, 62R. However, in other embodiments, the harness webbing 96 is formed of a material that is different than the lap webbing strips 60L, 60R, and/or the shoulder webbing strips 62L, 62R.

In the embodiment shown in FIGS. 3A and 3B, the wire harness 98 extends within the harness pocket 112 formed by opposing first and second webbing portions 106, 108. However, embodiments are intended to include or otherwise cover any other configuration that impedes forces applied to the wire harness 98 or otherwise impedes the wire harness 98 from being damaged. By way of example only, the harness pocket 112 could be formed from a single piece of webbing that is folded on itself and the connected together adjacent its former edges by any appropriate process such as but not limited to stitching, sewing, gluing, etc. In addition, and as similarly disclosed above, tube webbing can be used with the wiring extending within the tube.

Embodiments are also intended to include or otherwise cover methods of using and methods of manufacturing any or all of the elements disclosed above. Various aspects of the disclosed apparatus, such as the sensor, controller, and indicator, as well as the methods of manufacturing, include or otherwise cover processors and computer programs implemented by processors.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A vehicular seat belt assembly for restraining a vehicular passenger disposed in a seat upon application of a force applied to the passenger, the restraint being performed via cooperation with a vehicular support structure and based at least in part by contact with the passenger's lap and upper body, the vehicular seat belt assembly comprising:
   a pair of lateral webbing strips configured to extend laterally across the passenger's lap and that each define distal and proximal ends, the distal end of each lateral webbing strip being statically secured to the vehicular support structure, and the proximal ends being manually connectable and dis-connectable from each other;
   a vertically extending webbing strip that includes a pair of upper body strips that are configured to contact opposite sides of a front of the passenger's upper body, a proximal end of each upper body strip being directly or indirectly connected to a respective one of the lateral webbing strips;
   a sensor that is configured to provide data indicative of whether the proximal ends of the pair of lateral webbing strips are connected together; and
   a harness assembly that includes a harness webbing that is attached to one of the pair of lateral webbing strips, and a wire harness that is connectable to the sensor, the wire harness being disposed so as to extend along the harness webbing.

2. The vehicular seat belt assembly according to claim 1, wherein the harness webbing includes one of the following structures: first and second webbing portions that are secured to each other adjacent lateral sides thereof so as to define a harness pocket therebetween; and tube webbing that defines a channel therewithin.

3. The vehicular seat belt assembly according to claim 2, wherein the wire harness extends within the harness pocket of the harness webbing.

4. The vehicular seat belt assembly according to claim 1, further including a controller that is connected to the sensor by the wire harness, the sensor transmitting data to the controller indicating whether the proximal ends of the pair of lateral webbing strips are connected together.

5. The vehicular seat belt assembly according to claim 4, further including an indicator that is operationally connected to the controller, the indicator being configured to provide an indication as to whether the proximal ends of the pair of lateral webbing strips are connected together upon receipt of a corresponding signal from the controller.

6. The vehicular seat belt assembly according to claim 1, wherein opposite ends of the harness webbing are attached to the one of the pair of lateral webbing strips so as to generally form a U-shaped configuration.

7. The vehicular seat belt assembly according to claim 1, wherein the harness webbing has a length that is equal to or greater than a maximum adjustable length of the one of the pair of lateral webbing strips, and the wire harness has a length that is greater than the length of the harness webbing.

8. The vehicular seat belt assembly according to claim 1, further including a buckle attached to the proximal end of the one of the pair of lateral webbing strips, and a tongue attached to the proximal end of the other of the pair of lateral webbing strips, the tongue and buckle being configured to be manually releasably connected to each other.

9. The vehicular seat belt assembly according to claim 8, wherein the sensor is disposed within the buckle.

10. The vehicular seat belt assembly according to claim 8, further including:
    a retractor assembly that is configured to enable length adjustment of the vertically extending webbing strip if the load applied to the upper body strips is below a certain threshold level, while limiting or disabling length adjustment of the vertically extending webbing strip if the load substantially equal to or greater than the certain threshold level; and
    an anchor that is statically secured to the vehicular support structure, the anchor being configured to guide each of the upper body strips so as to enable a change in a direction of extension of the upper body strips, and to thereby absorb a portion of a load created by the force applied to the passenger and applied to the upper body strips.

11. A vehicular seating and restraint system for restraining a vehicular passenger upon application of a force applied to the passenger, the restraint being performed via cooperation with a vehicular support structure and based at least in part by contact with the passenger's lap and upper body, the vehicular seating and restraint system comprising:
    a seat that includes an upper portion defining an aperture and opposing front and back sides, the front side being configured to support the passenger's upper body; and
    a vehicular seat belt assembly that includes:
        a lap restraint assembly that includes a pair of lap anchors and a pair of lateral webbing strips that are configured to extend laterally across the passenger's lap and that each define distal and proximal ends, the distal end of each lateral webbing strip being statically secured to the vehicular support structure by one of the lap anchors, and the proximal ends being manually connectable and dis-connectable from each other;
        a vertically extending webbing strip that includes a pair of upper body strips that are configured to contact opposite sides of a front of the passenger's upper body and extend through the aperture of the seat, a proximal end of each upper body strip being directly or indirectly connected to a respective one of the lateral webbing strips;

a sensor that is configured to provide data indicative of whether the proximal ends of the pair of lateral webbing strips are connected together; and a harness assembly that includes a harness webbing that is attached to one of the pair of lateral webbing strips, and a wire harness that is connectable to the sensor, the wire harness being disposed so as to extend along the harness webbing.

12. The vehicular seating and restraint system according to claim 11, wherein the harness webbing includes one of the following structures: first and second webbing portions that are secured to each other adjacent lateral sides thereof so as to define a harness pocket therebetween; and tube webbing that defines a channel therewithin.

13. The vehicular seating and restraint system according to claim 12, wherein the wire harness extends within the harness pocket of the harness webbing.

14. The vehicular seating and restraint system according to claim 11, further including a controller that is connected to the sensor by the wire harness, the sensor transmitting data to the controller indicating whether the proximal ends of the pair of lateral webbing strips are connected together.

15. The vehicular seating and restraint system according to claim 14, further including an indicator that is operationally connected to the controller, the indicator being configured to provide an indication as to whether the proximal ends of the pair of lateral webbing strips are connected together upon receipt of a corresponding signal from the controller.

16. The vehicular seating and restraint system according to claim 11, wherein opposite ends of the harness webbing are attached to the one of the pair of lateral webbing strips so as to generally form a U-shaped configuration.

17. The vehicular seating and restraint system according to claim 11, wherein the harness webbing has a length that is equal to or greater than a maximum adjustable length of the one of the pair of lateral webbing strips, and the wire harness has a length that is greater than the length of the harness webbing.

18. The vehicular seating and restraint system according to claim 11, further including a buckle attached to the proximal end of the one of the pair of lateral webbing strips, and a tongue attached to the proximal end of the other of the pair of lateral webbing strips, the tongue and buckle being configured to be manually releasably connected to each other, the sensor being disposed within the buckle.

19. The vehicular seating and restraint system according to claim 11, further including:

a retractor assembly that is configured to enable length adjustment of the vertically extending webbing strip if the load applied to the upper body strips is below a certain threshold level, while limiting or disabling length adjustment of the vertically extending webbing strip if the load substantially equal to or greater than the certain threshold level; and an anchor that is statically secured to the vehicular support structure adjacent the back side of the upper portion of the seat, the anchor being configured to guide each of the upper body strips so as to enable a change in a direction of extension of the upper body strips, and to thereby absorb a portion of a load created by the force applied to the passenger and applied to the upper body strips.

20. A method of configuring a vehicular seat belt assembly to enable restraint of a vehicular passenger disposed in a seat upon application of a force applied to the passenger, the method comprising:

extending a pair of lateral webbing strips laterally across a lower portion of the seat such that proximal ends of the lateral webbing strips are manually connectable to and dis-connectable from each other;

statically securing a distal end of each lateral webbing strip to a vehicular support structure;

disposing a vertically extending webbing strip, which includes a pair of upper body strips, such that the upper body strips extend over opposite sides of a front of an upper portion of the seat;

directly or indirectly connecting a proximal end of each upper body strip to a respective one of the lateral webbing strips;

configuring a sensor to provide data indicative of whether the proximal ends of the pair of lateral webbing strips are connected together;

attaching a harness webbing to one of the pair of lateral webbing strips;

connecting a wire harness to the sensor; and disposing the wire harness so as to extend along the harness webbing.

* * * * *